US010759218B2

(12) United States Patent
Wohlfarth et al.

(10) Patent No.: US 10,759,218 B2
(45) Date of Patent: Sep. 1, 2020

(54) TRACK WIDENING SYSTEM FOR MOTOR VEHICLES

(71) Applicant: Klaus Wohlfarth, Fichtenberg (DE)

(72) Inventors: Klaus Wohlfarth, Fichtenberg (DE); Andreas Weidner, Gschwend (DE); Edgar Simonjan, Vellberg (DE)

(73) Assignee: Klaus Wohlfarth, Fichtenberg (DE)

( * ) Notice: Subject to any disclaimer, the term of this patent is extended or adjusted under 35 U.S.C. 154(b) by 0 days.

(21) Appl. No.: 16/147,256

(22) Filed: Sep. 28, 2018

(65) Prior Publication Data

US 2019/0039408 A1 Feb. 7, 2019

Related U.S. Application Data

(63) Continuation-in-part of application No. 14/823,502, filed on Aug. 11, 2015, now Pat. No. 10,086,644.

(30) Foreign Application Priority Data

Aug. 12, 2014 (DE) .................. 10 2014 215 986
Jan. 19, 2015 (DE) .................. 20 2015 000 487 U (51) Int. Cl.
*B60B 3/14* (2006.01)
*B60B 23/12* (2006.01)
*B60B 3/16* (2006.01)

(52) U.S. Cl.
CPC ............... *B60B 3/147* (2013.01); *B60B 3/16* (2013.01); *B60B 23/12* (2013.01); *B60B 2360/32* (2013.01); *B60B 2360/341* (2013.01)

(58) Field of Classification Search
CPC .......... B60B 3/14; B60B 3/145; B60B 3/147; B60B 7/0013; B60B 7/06; B60B 7/065; B60B 7/08
See application file for complete search history.

(56) References Cited

U.S. PATENT DOCUMENTS

| 3,649,079 A | 3/1972 | English |
| 3,998,494 A | 12/1976 | Spisak |
| 4,847,030 A | 7/1989 | Stalter |

(Continued)

FOREIGN PATENT DOCUMENTS

| CN | 103476600 | 12/2013 |
| DE | 42 27 259 C1 | 3/1994 |

(Continued)

OTHER PUBLICATIONS

Office Action received in connection with foreign priority application DE 10 2014 215 986.5, dated Dec. 22, 2014.

(Continued)

*Primary Examiner* — Jason R Bellinger
(74) *Attorney, Agent, or Firm* — Flynn Thiel, P.C.

(57) ABSTRACT

A track widening system for motor vehicles, having at least one track widening disc and at least one centering ring which is inserted into a central opening of the track widening disc. The centering ring has at least one first catch device which is arranged at the free end of a resilient arm and the track widening disc has a corresponding second catch. The centering ring may include plastic, and may be fiber-reinforced. One or more centering rings may have different colors. One or more protrusions may extend from a hub centering position of a centering ring.

26 Claims, 11 Drawing Sheets

(56) References Cited

U.S. PATENT DOCUMENTS

| | | | |
|---|---|---|---|
| 5,112,112 | A | 5/1992 | Baba |
| 5,454,628 | A | 10/1995 | Maiworm et al. |
| 5,601,343 | A | 2/1997 | Hoffken |
| 5,636,905 | A | 6/1997 | Pagacz |
| 9,446,625 | B2 | 9/2016 | Huusmann |
| 10,086,644 | B2 * | 10/2018 | Wohlfarth ............... B60B 3/147 |

FOREIGN PATENT DOCUMENTS

| | | |
|---|---|---|
| DE | 94 02 438 U1 | 5/1994 |
| DE | 199 36 225 A1 | 10/1997 |
| DE | 297 11 384 U1 | 10/1997 |
| DE | 299 15 048 U1 | 2/2000 |
| DE | 299 21 934 U1 | 5/2000 |
| DE | 202015000487 | 2/2015 |
| EP | 0 607 417 A1 | 7/1994 |
| EP | 0 607 417 B1 | 11/1996 |
| JP | H07-500794 | 1/1995 |
| JP | H07-149102 | 6/1995 |
| JP | H08-268002 | 10/1996 |
| JP | H11-147401 | 6/1999 |
| JP | 2012-512077 | 5/2012 |
| JP | 3197651 | 5/2015 |
| WO | WO 94/04379 A1 | 3/1994 |
| WO | WO 2014/048551 A1 | 4/2014 |

OTHER PUBLICATIONS

International Search Report and Written Opinion pertaining to application PCT/EP2015/068329, dated Oct. 14, 2015.

Machine translation of DE 199 36 225 A1 (retrieved from EPO Dec. 10, 2015).

Machine translation of DE 94 02 438 U1 (retrieved from EPO Dec. 10, 2015).

Machine translation of WO 94/04379 A1 (retrieved from EPO Dec. 22, 2015).

Office Action received in connection with CN parallel application No. 201580055384.X, dated Nov. 2, 2018.

English translation of Office Action received in connection with JP parallel application No. 2017-507824, dated Dec. 28, 2018.

Machine translation of JP H07-149102 (retrieved from EPO Feb. 7, 2019).

* cited by examiner

TRACK WIDENING SYSTEM FOR MOTOR VEHICLES

CROSS-REFERENCE TO RELATED APPLICATIONS

The present application is a continuation-in-part of U.S. application Ser. No. 14/823,502 filed on Aug. 11, 2015, and issued as U.S. Pat. No. 10,086,644 on Oct. 2, 2018, which claims the benefit of priority of German Application No. 10 2014 215 986.5, filed Aug. 12, 2014, and of German Application No. 20 2015 000 487.3, filed Jan. 19, 2015, all of which are incorporated herein by reference in their entirety.

BACKGROUND

The invention relates to a track widening system or wheel spacer system for motor vehicles. More particularly, embodiments of the present invention pertain to systems having at least one track widening disc or wheel spacer disc and at least one centering ring for insertion into the track widening disc. There heretofore lacks a universal system enabling track widening of differing amounts and centering on wheels having different diameters.

BRIEF SUMMARY OF THE INVENTION

An object of the invention is to provide a track widening system for motor vehicles which can be used in a flexible manner for different wheels and different vehicles.

To this end, there is provided according to some embodiments of the present invention a track widening system that may include at least one track widening disc and a centering ring which is inserted into a central opening of the track widening disc. The centering ring may comprise plastic material. The centering ring may have at least one first catch device which is arranged at the free end of a resilient arm and the track widening disc has a corresponding second catch device.

Because the track widening system in accordance with some embodiments of the present invention may include a track widening disc and a separate centering ring, the track widening system can be flexibly adapted to different vehicles and different wheels. This is because the track widening disc has to fit on the wheel bolts of the vehicle and the centering ring must be adapted to the diameter of a central opening in the wheel so that the wheel is orientated during positioning on the centering ring precisely concentrically relative to the track widening disc or concentrically relative to the wheel hub or the pitch circle with the wheel bolts. The invention recognizes that the centering ring is not loaded during driving operation because the forces and momentums introduced by the wheel into the wheel hub and vice versa are transmitted exclusively by means of the track widening disc. Therefore, in some embodiments, the centering ring, which only carries out its centering function when the track widening disc is mounted and when the wheel is mounted, may comprise plastic material. The centering ring can thus be produced in a very cost-effective manner and also with extremely varied dimensions in order to be able to use the track widening system according to the invention for different vehicles and wheels. The centering ring may be constructed, for example, as a plastics injection-molded component, especially fiber-reinforced plastics, because, as mentioned, it is not subjected to any loads at all during driving operation. The production of the centering ring from plastics material, in particular from plastics injection-molded material, also makes it easier to produce different centering rings which then ensure the adaptation of the track widening discs to different wheels.

In some embodiments of the invention, the first catch device is in the form of a catch projection which projects outwards in a radial direction. In some implementations, the catch projection may be at the free end of a resilient arm which can readily be produced on a plastics component, such as a plastics injection-molded component. As above, the centering ring may not be subjected to any loads during driving operation and consequently the catch projection at the free end of a resilient arm may only be subject to forces which occur when the track widening disc and the wheel are mounted on the wheel hub. Advantageously, a plurality of resilient arms having catch projections may be provided on the centering ring at the free ends. In some implementations four resilient arms may be provided. However, it is to be appreciated that other number of arms and catch projections are contemplated in accordance with some embodiments of the invention.

In some embodiments, the second catch device may be a shoulder which extends around the central opening of the track widening disc. In some embodiments, the second catch device may be a chamfered portion which extends around the central opening. In some embodiments, the second catch device may be a groove which extends around the central opening.

A peripheral shoulder, a peripheral chamfered portion or a peripheral groove can be provided in the track widening disc, and unitarily formed. The track widening disc may be formed of metal, and thus the shoulder, chamfered portion, or peripheral groove can be mechanically processed at the same time as other features of the track widening disc. For example, and without limitation, the peripheral shoulder, the peripheral chamfered portion or the peripheral groove can therefore be formed in the track widening disc, for example, during a turning process. The outwardly projecting catch projections on the centering ring may engage in the central opening of the track widening disc when the centering ring is introduced. In the case of thick track widening discs, a groove may be provided in the inner wall of the central opening and, in the case of relatively thin track widening discs, the catch projections of the centering ring may engage at a peripheral shoulder or a peripheral chamfered portion which may be arranged at the transition between the central opening and the front side and/or rear side of the track widening disc.

In a development of the invention, the track widening disc may have a plurality of wheel bolt holes which are provided for the introduction of wheel bolts. A dimension of the wheel bolt holes in a radial direction of the track widening disc may be from about 1.2 times to about 1.7 times. For example, and without limitation, it may be 1.5 times the diameter of the wheel bolts. In some embodiments, the track widening disc may have at least one curved slot which extends in the peripheral direction as a wheel bolt hole. In this manner, different hole configurations can be covered with a track widening disc. In this manner, the number of individual components necessary for the track widening system according to the invention, in order to cover different vehicles and wheels, can also be substantially reduced. Different pitch circles in different vehicles can be covered by means of such a configuration of the wheel bolt holes in the track widening disc. It is also thereby possible to substantially reduce the number of different track widening discs which are necessary for different vehicles.

In some embodiments of the invention, a plurality of centering rings may be provided in the track widening system, wherein each centering ring has a retention portion for fixing to the track widening disc with at least a first catch device and a rim centering portion for arrangement in a central opening of a wheel. All the centering rings may have the same outer diameter in the retention portion and the centering rings may differ from each other at least partially in terms of the outer diameter of the rim centering portion.

It is thereby possible to ensure that all the centering rings which are different from each other can fit in all the track widening discs of the track widening system according to the invention and can be engaged therein. As already described, the corresponding second catch devices may also be arranged at mutually different track widening discs in an identical manner so that all the centering rings of the track widening system can be engaged.

In some implementations, a plurality of track widening discs of different thicknesses may be included in the track widening system.

In some implementations, the track widening discs may have differently arranged wheel bolt holes.

Although the track widening system in accordance with some embodiments of the invention may not require different track widening discs and different centering rings in order to be able to cover different vehicles and wheels, the necessary number of individual components, particularly the number of different track widening discs, can be substantially reduced. Different track widening discs may be provided to produce different dimensions for the track widening obtained.

In certain embodiments of the present invention, one or more protrusions may be provided on a hub centering portion of a centering ring. The inclusion of protrusions may allow for the compensation of tolerances of wheel hubs, thereby ensuring a secure fit when a centering ring is placed onto a wheel hub. In some embodiments, a protrusion may be in the form of a bump or a rib, which may be rounded and elongated. It is to be appreciated, however, that other dimensions and shapes of protrusions are contemplated in accordance with the present invention. Moreover, in some embodiments of the present invention, protrusions of varying dimensions and shapes can be provided on a hub centering portion.

The above-described objects, advantages and features of the invention, together with the organization and manner of operation thereof, will become apparent from the following detailed description when taken in conjunction with the accompanying drawings, wherein like elements have like numerals throughout the several drawings described herein. In addition, individual features of different embodiments which are described and/or illustrated in the drawings may be combined with each other without exceeding the scope of the invention. Further benefits and other advantages of the present invention will become readily apparent from the detailed description of the preferred embodiments.

BRIEF DESCRIPTION OF THE DRAWINGS

FIGS. 16A-D are views of different track widening discs.

DETAILED DESCRIPTION

Reference will now be made in detail to certain embodiments of the invention, examples of which are illustrated in the accompanying drawings. While the invention will be described in reference to these embodiments, it will be understood that they are not intended to limit the invention. To the contrary, the invention is intended to cover alternatives, modifications, and equivalents that are included within the spirit and scope of the invention as defined by the claims. In the following disclosure, specific details are given to provide a thorough understanding of the invention. However, it will be apparent to one skilled in the art that the present invention may be practiced without all of the specific details provided.

Figure 1:
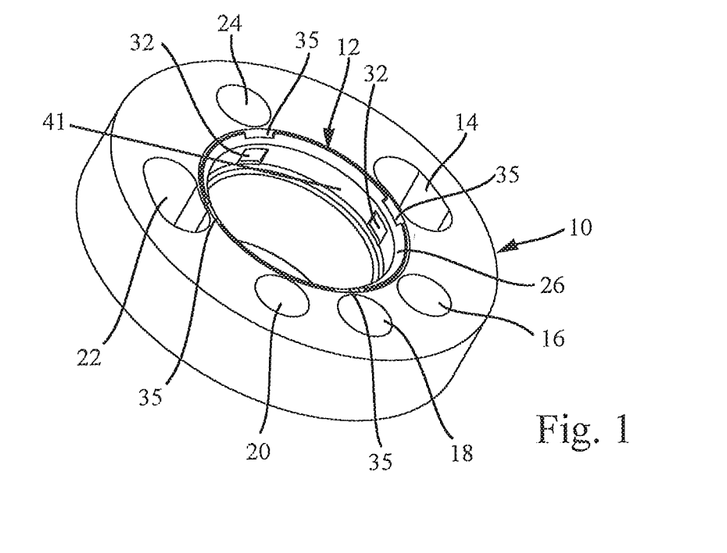
FIG. 1 is an oblique view of a track widening system including a track widening disc and a first centering ring in accordance with some embodiments of the present invention.

FIG. 1 illustrates a track widening disc 10 having a centering ring 12 of the track widening system according to the invention. The track widening disc 10 is illustrated has having a total of six wheel bolt holes 14, 16, 18, 20, 22 and 24, however, it is to be appreciated that other number of holes are contemplated in accordance with some embodiments of the present invention. The wheel bolt holes 16, 18, 20 and 24 may be constructed as circular holes whereas the wheel bolt holes 14 and 22 may be constructed as slots which extend in a peripheral direction of the track widening disc 10. Usually, wheel hubs of motor vehicles are provided with four or five wheel bolts. The wheel bolt holes 14 to 24 may consequently not all be used simultaneously for the introduction of wheel bolts but are instead arranged in such a manner that different hole configurations of wheel hubs can be covered with a single track widening disc 10. The two slots 14, 22 which are curved in a rounded manner may also be used for this. Furthermore, the diameter of the circular wheel bolt holes 16, 18, 20, 24 and the dimension of the wheel bolt holes 14, 22, when viewed in a radial direction, may be from about 1.2 to 1.7 times, and in some preferred embodiments, 1.5 times as large as the outer diameter of the wheel bolts used. Slightly different pitch circle diameters of wheel bolts in different vehicles can thereby be covered.

The centering ring 12, when viewed from the visible rear side of the track widening disc 10 in FIG. 1, may be inserted therein and may have a peripheral, chamfered collar 26 which defines an end position of the centering ring 12 on the track widening disc 10 in an axial direction. The abutment of the collar 26 against a corresponding chamfered portion 28 at the transition of the rear side of the track widening disc 10 into the central opening 30 thereof can be seen in the cross-section of FIG. 2, which rear side is shown at the top in FIG. 2.

The centering ring 12 may have four resilient arms 32, at the free end of which a catch projection 34 is arranged, respectively. However, it is to be appreciated that other numbers of resilient arms are contemplated in accordance with some embodiments of the present invention. The illustration of FIG. 1 depicts only two resilient arms 32 and associated catch projections 34. The catch projections 34 may engage in a groove 36 which extends radially outwards from the central opening 30 of the track widening disc 10. As a result, in some examples, the centering ring 12 may be introduced into the track widening disc 10 by the centering ring 12 in FIG. 2 being pushed into the track widening disc 10 from above until the chamfered collar 26 abuts the chamfered portion 28 of the track widening disc 10 and, at the same time, the catch projections 34 engage in the peripheral groove 36. The catch projections 34 can be disengaged from the groove 36 by a tool, for example, a screwdriver, being inserted into the recesses 35 of the centering ring 12. However, the catch projections 34 may also be disengaged without tools, such as by pressing powerfully on the centering ring 12.

The centering ring 12 may have a retention portion 38 whose outer diameter is only slightly smaller than the inner diameter of the central opening 30 of the track widening disc 10. The centering ring 12 may be retained with this retention portion 38 in the central opening 30 of the track widening disc 10 and centered in relation to the central opening 30. Furthermore, the centering ring 12 may include a rim centering portion 40 which projects beyond the front side of the track widening disc 10, which side is shown at the bottom in FIG. 2, and may be provided in order to be pushed into the central opening of a wheel. Consequently, the outer diameter of the circular-cylindrical rim centering portion 40 corresponds to the diameter of the central opening of the wheel provided for assembly, or is only slightly smaller than the diameter of that central opening. The inner diameter of the retention portion 38, said inner diameter forming a hub centering portion 41, may correspond to the outer diameter of the rim centering portion 40. The rim centering portion 40 can be made slightly conical which is explained in detail in conjunction with FIG. 23.

The centering ring 12 may also have a hub centering portion 41 which is intended to be placed on the outer diameter of a wheel hub. By simply pushing the hub centering portion 41 onto the wheel hub, the centering ring 12 and the track widening disc 10 can then be centered on the wheel hub. According to some embodiments of the invention, different centering rings 12 may be provided with different inner diameters of the hub centering portion 41 in order to be used with different types of vehicles having different outer diameters of the wheel hub. The hub centering portion 41 can be made slightly conical which is explained in detail in conjunction with FIG. 23.

Figure 2:
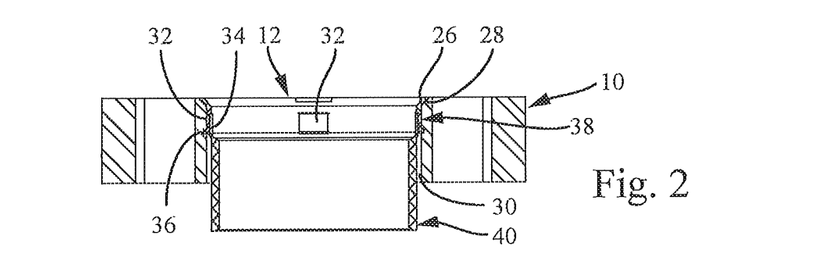
FIG. 2 is a cross-sectional view of the system of FIG. 1.

It can be seen in FIG. 1 and FIG. 2 that different centering rings 12 can be introduced into the track widening disc 10 in the track widening system according to the invention in order to be able to center wheels having different diameters in respect of their central openings relative to the track widening disc 10. It can further be seen that the track widening disc 10 can be used for different pitch circles and different hole configurations of wheel hubs of vehicles. Consequently, the track widening system according to the invention makes it possible to manage with substantially fewer individual components and be able to cover a large number of different vehicles and different wheels.

Figure 3:
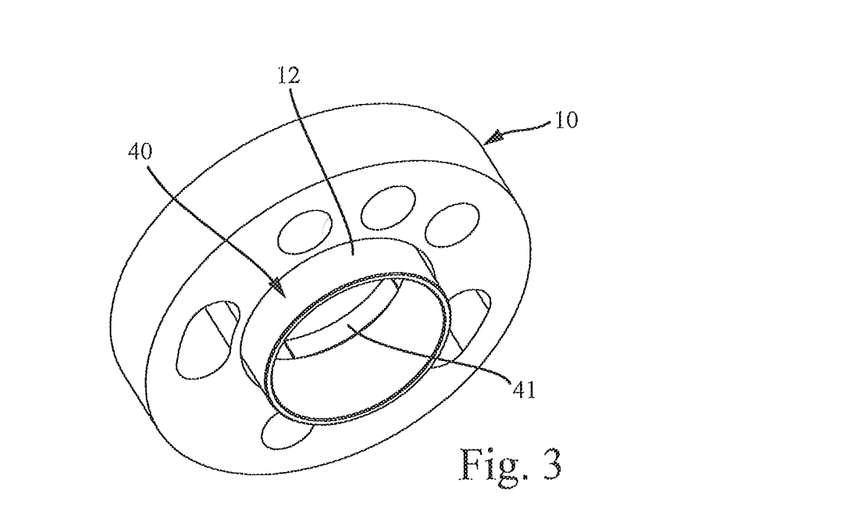
FIG. 3 is an oblique view of the system of FIG. 1.

The illustration of FIG. 3 is an oblique front view of the track widening disc 10 with the centering ring 12 inserted. As shown, the rim centering portion 40 of the centering ring 12 may project beyond the front side of the track widening disc 10 and can thereby be introduced into the central opening of a wheel.

Figure 4:
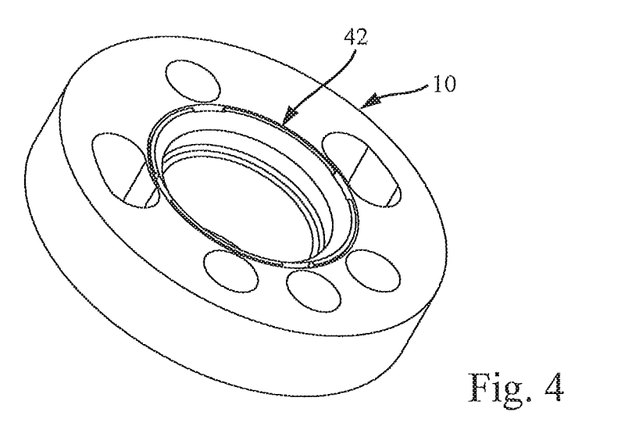
FIG. 4 is an oblique view of a track widening system including the track widening disc of FIG. 1 and a second centering ring in accordance with some embodiments of the present invention.
Figure 5:
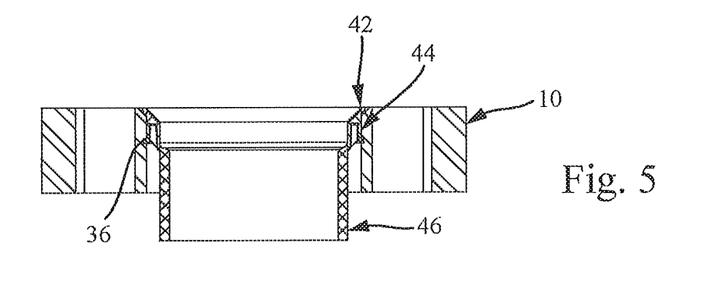
FIG. 5 is a cross-sectional view of the system of FIG. 4.
Figure 6:
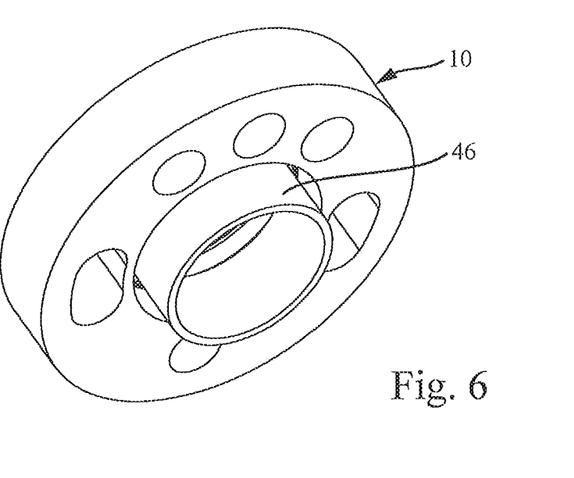
FIG. 6 is an oblique view of the system of FIG. 4.

The illustrations of FIGS. 4 to 6 show the track widening disc 10 which has already been illustrated in FIG. 1, with a different centering ring 42 having been introduced into the track widening disc 10. Centering ring 42 may have a retention portion 44 having the same outer diameter as the centering ring 12. Therefore, the centering ring 42 can also be introduced into the central opening 30 of the track widening disc 10 and, similarly to the centering ring 12, can be engaged in the groove 36 of the track widening disc 10 by means of catch projections.

Unlike the centering ring 12, the centering ring 42 may have a rim centering portion 46 with an outer diameter which is smaller than the rim centering portion 40 of the centering ring 12. By the centering ring 42 being introduced into the track widening disc 10 in place of the centering ring 12, consequently, the track widening disc 10 can be adapted to wheels with a smaller diameter of the central opening 30.

Figures 7, 8:
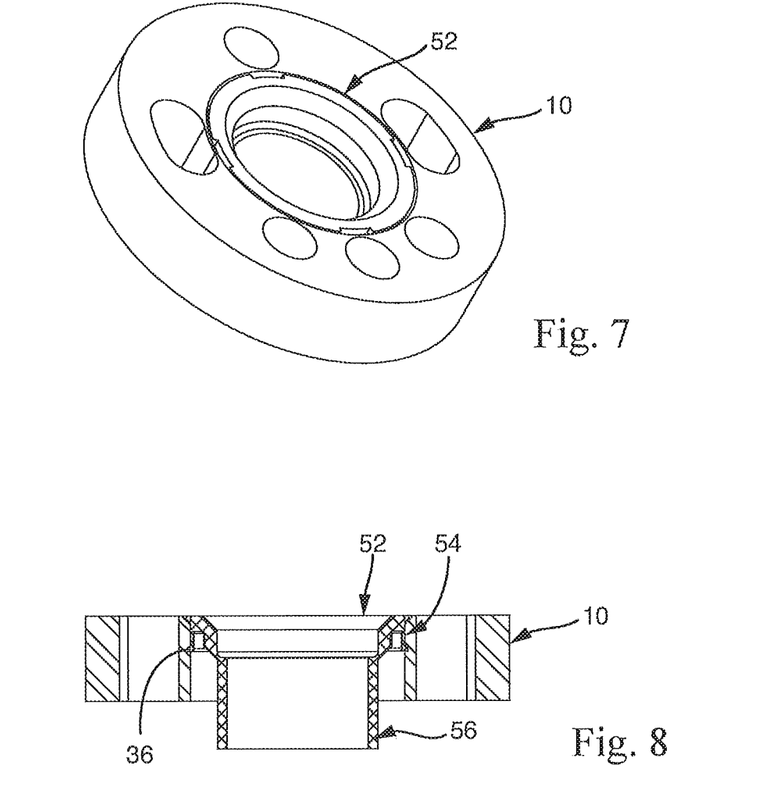
FIG. 7 is an oblique view of a track widening system including the track widening disc of FIG. 1 and a third centering ring in accordance with some embodiments of the present invention.
FIG. 8 is a cross-sectional view of the system of FIG. 7.
Figure 9:
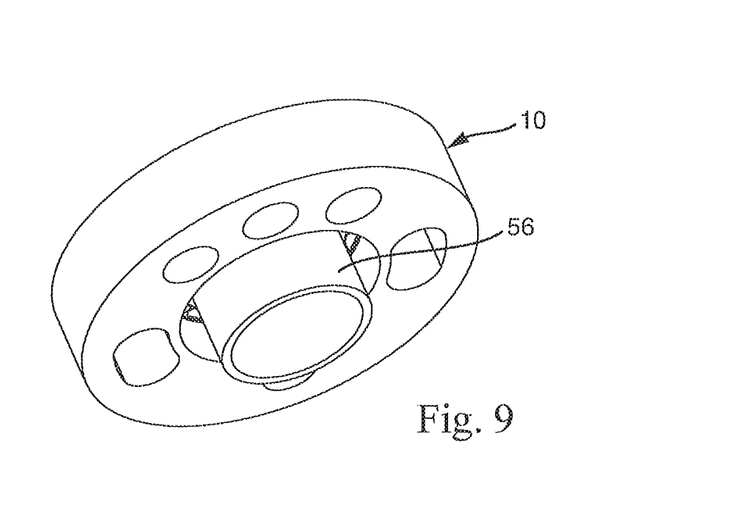
FIG. 9 is an oblique view of the system of FIG. 7.

The illustrations of FIGS. 7 to 9 show the track widening disc 10 of FIG. 1, with a different centering ring 52 having been introduced into the central opening 30 of the track widening disc 10 in place of the centering ring 12. The centering ring 52 may also have (and as illustrated more fully in the cross-sectional illustration of FIG. 8) a retention portion 54 which may have the same outer diameter as the retention portion 38 of the centering ring 12 (as shown in FIG. 2) and the retention portion 44 of the centering ring 42 (as shown in FIG. 5). The centering ring 52 can also be introduced into the central opening 30 of the track widening disc 10 and can be engaged in the groove 36 of the track widening disc 10 by means of the catch projections on the resilient arms.

Unlike the centering rings 12, 42, the centering ring 52 may have a rim centering portion 56 with an even smaller outer diameter. By the centering ring 52 being introduced, consequently, the track widening disc 10 can be used for wheels having an even smaller diameter of the central opening 30.

Figure 10:
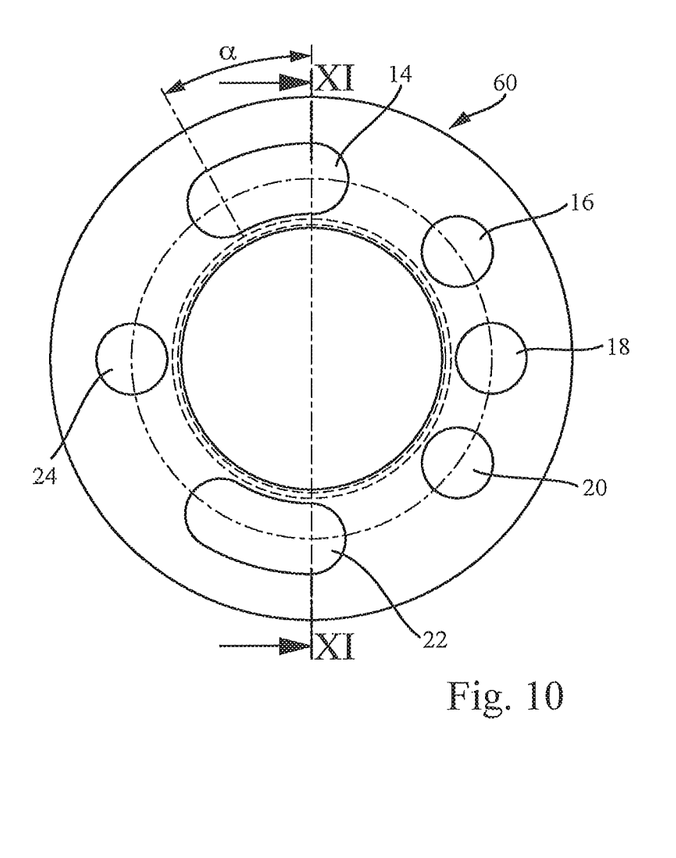
FIG. 10 is a plan view of a track widening disc of a track widening system in accordance with some embodiments of the present invention.

The illustration of FIG. 10 is a plan view of another track widening disc 60 according to the invention. The track widening disc 60 may have, similarly to the track widening disc 10 of FIG. 1, a total of six wheel bolt holes 14, 16, 18, 20, 22 and 24, however other numbers of wheel bolt holes are contemplated in accordance with some embodiments of the present invention. It can clearly be seen in FIG. 10 that track widening disc 60 may have two curved slots 14, 22 extending over an angular range a in order to be able to cover wheel hubs having different hole configurations.

Figure 11:
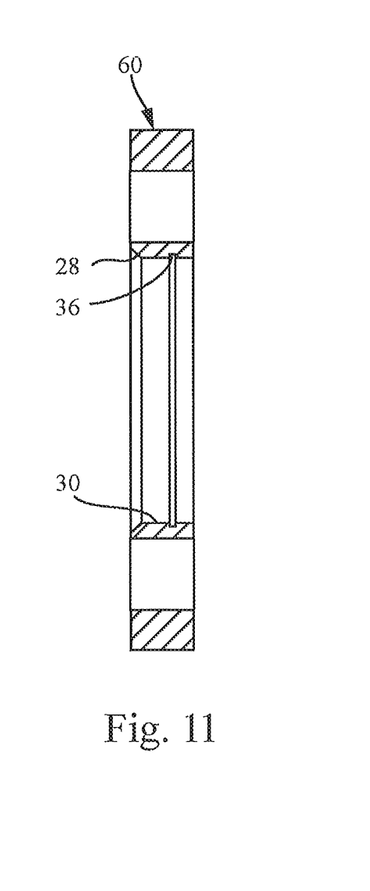
FIG. 11 is a cross-sectional view of FIG. 10 along section XI-XI.

The illustration of FIG. 11 is a cross-sectional view of FIG. 10 along the plane of section XI-XI. As illustrated, a groove 36, in the central opening 30 of the track widening disc 10, may be provided for the catch projections of the centering rings. Also illustrated is the chamfered portion 28 at the transition of the rear side of the track widening disc 60 into the central opening 30, which rear side is arranged on the left in FIG. 11. As discussed above, the chamfered portion 28 may serve to receive the collar 26 of the centering rings, which collar may also be chamfered, and thereby form a stop when the centering ring is introduced into the track widening disc 60.

Figure 12:
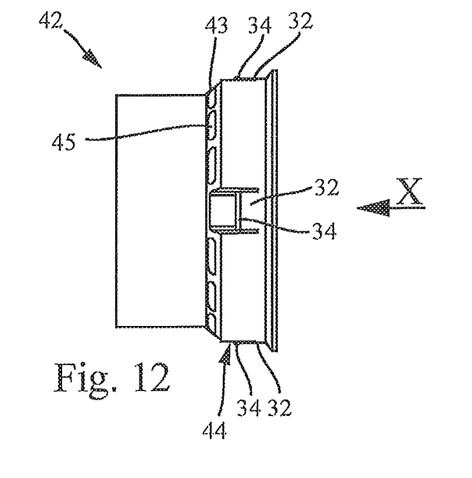
FIG. 12 is a side view of a centering ring of a track widening system in accordance with some embodiments of the present invention.

The illustration of FIG. 12 is a side view of the centering ring 42 of FIG. 5. As above, the centering ring 42 may have a retention portion 44 whose outer diameter is adapted to the inner diameter of the central opening of the track widening discs and in which the resilient arms 32 are also arranged, at the free ends of which there may also be arranged catch projections 34 which extend radially outwards in relation to the centering ring 42. When viewed over the periphery of the centering ring 42, a total of four resilient arms 32 each having a catch projection 34 are arranged at the free end. However, it is to be appreciated other numbers of resilient arms are contemplated in accordance with some embodiments of the invention. A frustoconical chamfered portion 43 may be provided at the transition between the retention portion 44 and the rim centering portion 46. That chamfered portion 43 may vary with the difference in diameter between the retention portion 44 and the rim centering portion 46. A plurality of slot-like recesses 45 may be provided in the chamfered portion 43 over the periphery. Those recesses 45 may be used to keep the material thickness of the centering ring 42 substantially constant in order to prevent deformation of the plastics material during manufacturing.

Figure 13:
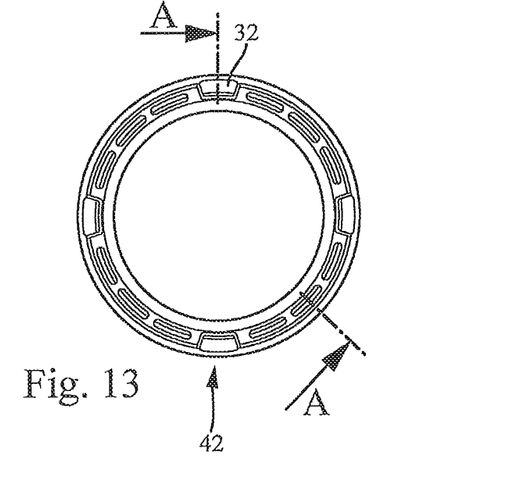
FIG. 13 is a forward view of the centering ring of FIG. 12.
Figures 14, 15:
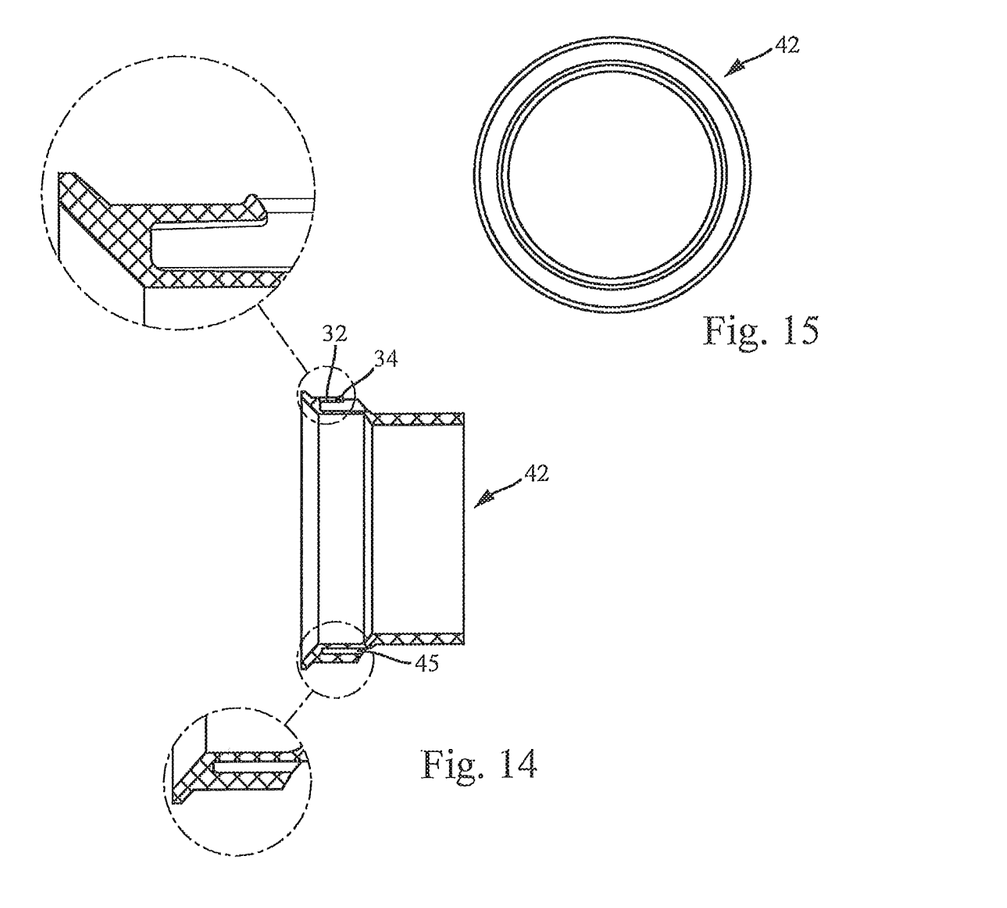
FIG. 14 is a cross sectional view of FIG. 13 along section A-A, including two enlarged detailed illustrations.
FIG. 15 is a reverse view of the centering ring of FIG. 12.

The illustration of FIG. 13 is a front view of the centering ring 42 (e.g., from the left in FIG. 12). FIG. 14 is a cross-section along the line A-A in FIG. 13. Consequently, the planes of section A-A extend in FIG. 14 through a resilient arm 32 having a catch projection 34 and, at the bottom in FIG. 14, through one of the recesses 45. FIG. 14 further contains two enlarged detailed illustrations, in which the regions of FIG. 14 have been illustrated to an enlarged scale, which regions are circled in a dot-dash manner.

FIG. 15 is a rear view of the centering ring 42 of FIG. 12, that is to say, from the right in FIG. 12.

Figure 16A:
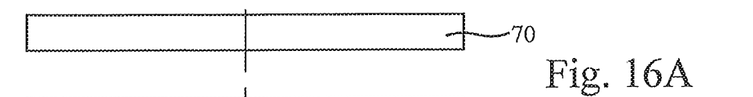
Figure 16B:
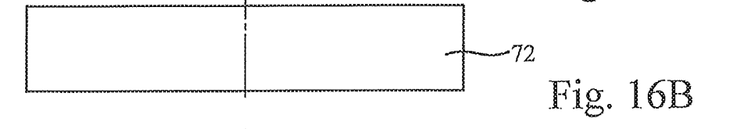
Figure 16C:
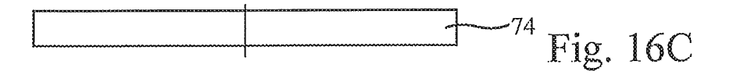
Figure 16D:
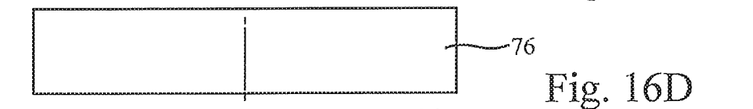
Figure 16E:
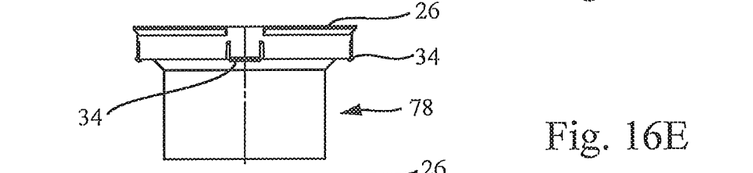
FIGS. 16E-J are views of different centering rings, each in accordance with some embodiments of the present invention, shown centrally aligned.
Figure 16F:
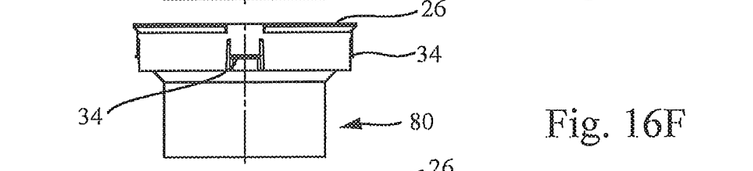
Figure 16G:
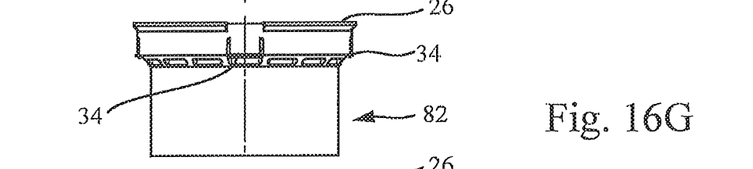
Figure 16H:
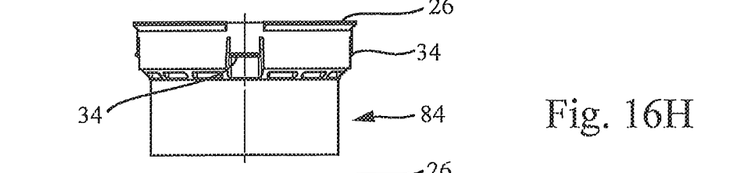
Figure 16I:
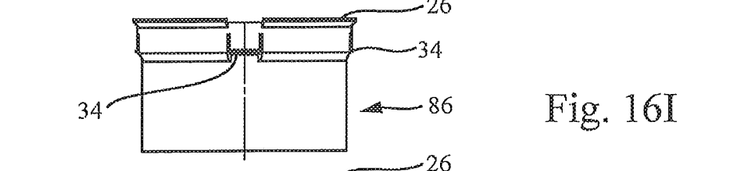
Figure 16J:
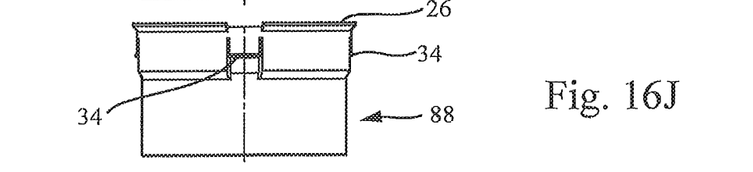
Figure 17A:
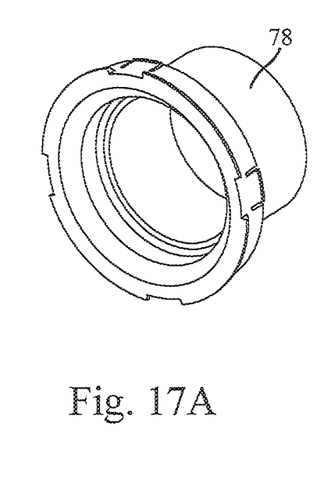
FIGS. 17A and 17B are oblique forward and reverse side views of a centering ring of a track widening system in accordance with some embodiments of the present invention.
Figure 17B:
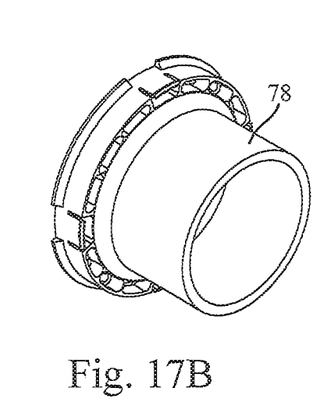
Figure 18A:
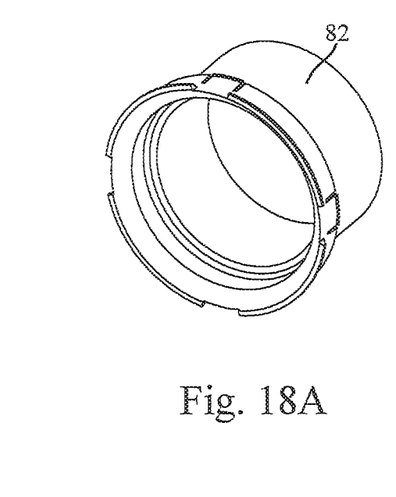
FIGS. 18A and 18B are oblique forward and reverse side views of a centering ring of a track widening system in accordance with some embodiments of the present invention.
Figure 18B:
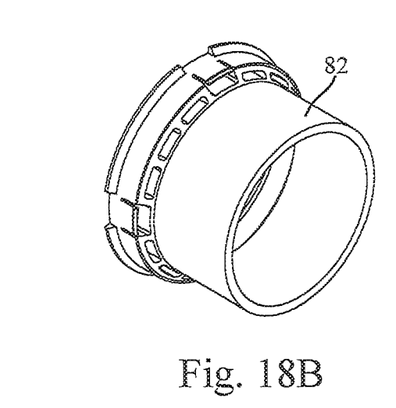
Figure 19A:
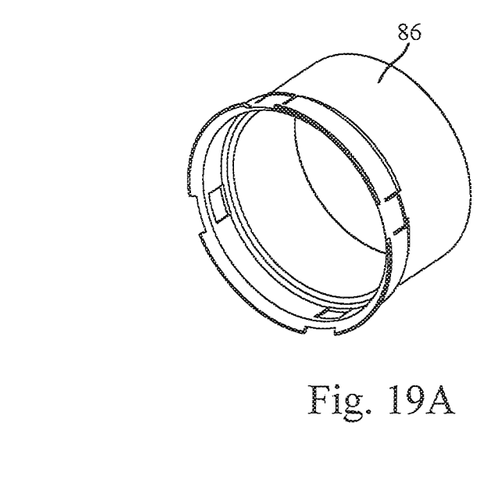
FIGS. 19A and 19B are oblique forward and reverse side views of a centering ring of a track widening system in accordance with some embodiments of the present invention.
Figure 19B:
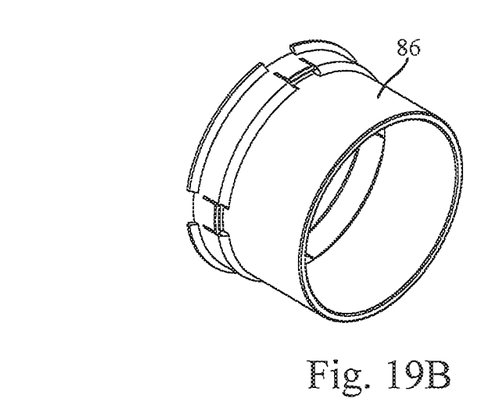
Figure 20A:
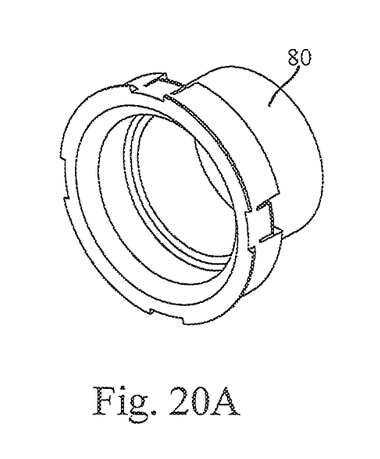
FIGS. 20A and 20B are oblique forward and reverse side views of a centering ring of a track widening system in accordance with some embodiments of the present invention.
Figure 20B:
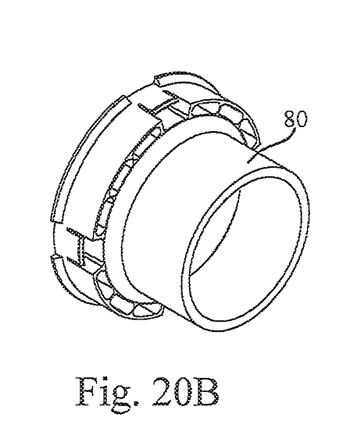
Figure 21A:
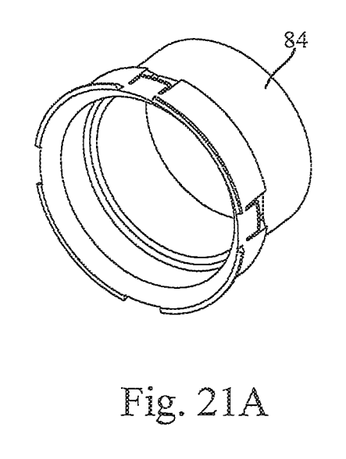
FIGS. 21A and 21B are oblique forward and reverse side views of a centering ring of a track widening system in accordance with some embodiments of the present invention.
Figure 21B:
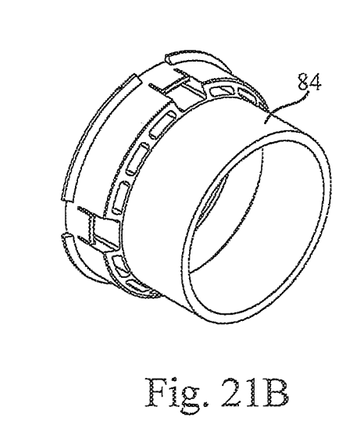
Figure 22A:
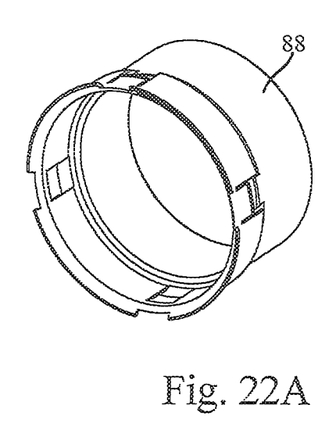
FIGS. 22A and 22B are oblique forward and reverse side views of a centering ring of a track widening system in accordance with some embodiments of the present invention.
Figure 22B:
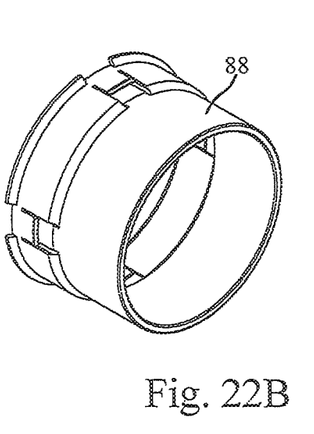

The illustrations of FIGS. 16A to 16J show, by way of example, a track widening system according to the invention having a total of four different track widening discs 70 (FIG. 16A), 72 (FIG. 16B), 74 (FIG. 16C) and 76 (FIG. 16D). It is to be appreciated that although four track widening discs are illustrated in the example of FIGS. 16A-D, track widening systems in accordance with some embodiments of the present invention may include other numbers of track widening discs. The track widening discs 70 and 72 are illustrated as differing in terms of the thickness thereof, as do the track widening discs 74 and 76. The track widening discs 70, 72 are illustrated as having a greater outer diameter than the track widening discs 74, 76. In some embodiments, a diameter of a central opening of the track widening discs 70, 72, 74, 76 is always constructed so as to be precisely the same so that different centering rings can be introduced into each of the track widening discs 70, 72, 74 and 76. As illustrated, in some embodiments six different centering rings 78 (FIG. 16E), 80 (FIG. 16F), 82 (FIG. 16G), 84 (FIG. 16H), 86 (FIGS. 16I) and 88 (FIG. 16J) can be introduced into the track widening discs 70, 72, 74 and 76. However, it is to be appreciated that track widening systems in accordance with some embodiments of the present invention may include other numbers of centering rings. With reference to FIGS. 16E to 16J, it can also be seen that the centering rings 78, 80, 82, 84, 86, 88 may differ in terms of the outer diameter of the rim centering portion thereof and may also differ in terms of the axial length of the retention portion thereof. However, the catch projections 34 with which the centering rings 78, 80, 82, 84, 86, 88 are engaged with the track widening discs 70, 72, 74, 76 are, in preferred embodiments, always arranged with the same spacing from the chamfered collar 26 of the centering rings 78, 80, 82, 84, 86, 88. This makes it possible for track widening discs 70, 72, 74, 76 and centering rings 78, 80, 82, 84, 86, 88 to be interchanged.

In some embodiments, the centering rings 78, 80 may have the same outer diameter of the rim centering portion and may have for identification a different but related colour (e.g. dark red and light red). The centering rings 82, 84 may have a larger diameter of the rim centering portion when compared to the centering rings 78, 80; both centering rings 82, 84, however, in accordance with some embodiments of the invention, may have the same outer diameter of the rim centering portion. The centering rings 78, 80 may have for identification a different but related colour (e.g., yellow and orange) which is different than the colouring of the centering rings 78, 80. The centering rings 86, 88 are illustrated as having the biggest diameter of the rim centering portion of all centering rings and, for identification, may have a different but related colour (e.g. a bright white and a darker white) which is different than the colouring of the other centering rings. It is to be appreciated that, in preferred embodiments, all centering rings of different dimensions (e.g., centering rings 78, 80, 82, 84, 86, 88) may have a different colour. It is further to be appreciated that in accordance with some embodiments of the invention other identifying features may distinguish the different centering rings. For example, and without limitation, the centering rings may have text or symbolic markings thereon for distinguishing purposes. In preferred embodiments, centering rings having the same outer diameter of the rim centering portion may have a related colour. Such a colour identification system according to the invention is independent of the provision of catch devices. As a consequence, such a colour identification system is independent of the provision of the catch projections 34 on the resilient arms 32 and can be realized with centering rings without catch devices.

The illustrations of FIGS. 17A-B, 18A-B, 19A-B, 20A-B, 21A-B, and 22A-B show in each case two views of the centering rings 78, 80, 82, 84, 86, 88, respectively, an oblique front view and an oblique rear view.

Figure 23:
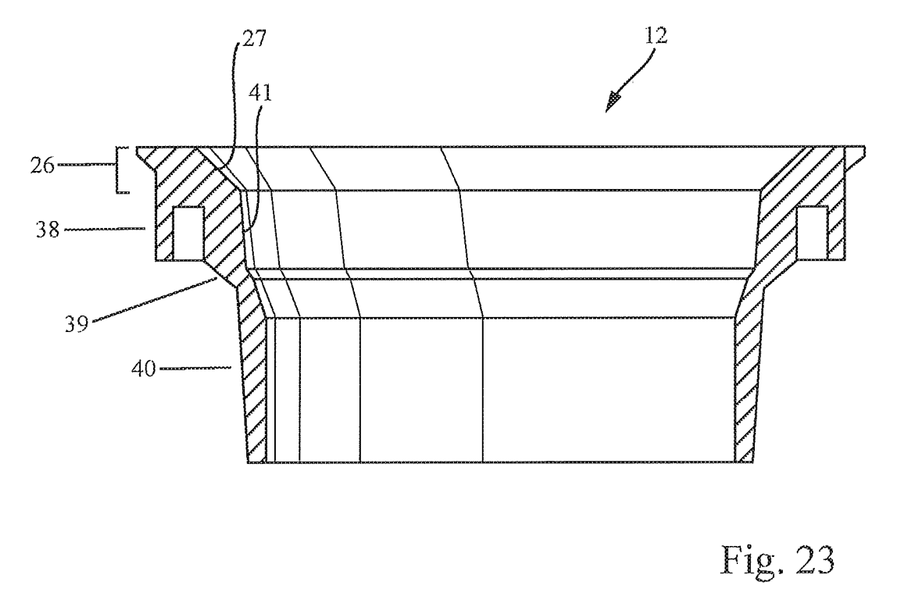
FIG. 23 is a cross-sectional view of a centering ring of a track widening system in accordance with some embodiments of the present invention.

FIG. 23 shows a schematical cross-section of a centering ring 12 according to the invention. FIG. 23 is not drawn to scale, rather, the conicity of the hub centering portion 41 and the rim centering portion 40 is exaggerated to show these features. Apart from the special shape of the rim centering portion 40 and the hub centering portion 41, the centering ring 12 may comprise the same features as the centering rings already described.

As above with reference to FIGS. 1 and 2, the retention portion 38 of the centering ring 12 may be fixed to a track widening disc 10 (not illustrated in FIG. 23). Together with the centering ring 12, the track widening disc 10 may be pushed onto the wheel hub of a car. The inner diameter of the retention portion 38 may be formed by the hub centering portion 41. The inside portion 27 of the chamfered collar 26 may help to center the centering ring 12 on the wheel hub. Similar to some other embodiments of the present invention as described above, centering ring 12 may include a frustoconical chamfered portion 39 at the transition between retention portion 38 and rim centering portion 40. An inner surface of frustoconical chamfered portion 39 may have one or more transition points at which the inner diameter narrows between hub centering portion 41 and a point on an inner surface of rim centering portion 40. The hub centering portion 41 can be slightly conical, as illustrated in FIG. 23. Again, FIG. 23 is not drawn to scale, and the conicity of hub centering portion 41 is strongly exaggerated to illustrate some embodiments of the invention. The centering ring 12 may be pushed onto the circular-cylindrical outer diameter of the wheel hub. The hub centering portion 41 may have a wider diameter adjacent the chamfered collar 26 and a narrower diameter in a direction away from the chamfered collar 26. When pushing the centering ring 12 onto the wheel hub, the centering ring 12 may, therefore, be centered onto the wheel hub. In such implementations of the invention, tolerances of the outer diameter of the wheel hub can be compensated. By making the hub centering portion 41 slightly conical, the centering ring 12 can be placed onto the wheel hub free from play. In addition, since the centering ring 12 may comprise plastic, the slight conicity of the hub centering portion 41 makes it easier to get the centering ring 12 out of a form during manufacturing. In some examples, and without limitation, the diameter of the hub centering portion 41 narrows by a few tenths of a millimetre (e.g., if the diameter of the hub centering portion 41 amounts to 58.3 mm at its upper end in FIG. 23 adjacent to the chamfered collar 26, it may then narrow down to 58 mm at its lower end). It is to be appreciated that other dimensions are contemplated in accordance with some embodiments of the invention.

It can also be seen in FIG. 23 that an outer surface of rim centering portion 40 may also be slightly conical and narrow its diameter from top down in FIG. 23. The conicity of an outer surface of rim centering portion 40 is also strongly exaggerated in FIG. 23 to illustrate some embodiments of the invention. The largest diameter of the rim centering portion 40 may be, therefore, placed adjacent to the retention portion 38 and the smallest diameter of the rim centering portion 40 may be placed at the end of the centering ring 12 opposite the retention portion 38. When a wheel is placed onto the centering ring 12, tolerances of the inner diameter of the central opening of a wheel can therefore be compensated. By making an outer surface of rim centering portion 40 slightly conical, the centering ring 12 can, therefore, be arranged without play in the central opening of a wheel. In addition, making an outer surface of rim centering portion 40 slightly conical makes it easier to get the plastic centering ring 12 out of its form during manufacturing. In some examples, and without limitation, the diameter of an outer surface of rim centering portion 40 narrows for only a few tenths of a millimetre (e.g., if the diameter of the rim centering portion 40 amounts to 58 mm at its upper end in FIG. 23, adjacent to the retention portion 38, it will narrow down to 57.5 mm at its lower end). It is to be appreciated that other dimensions are contemplated in accordance with some embodiments of the invention.

Figure 24:
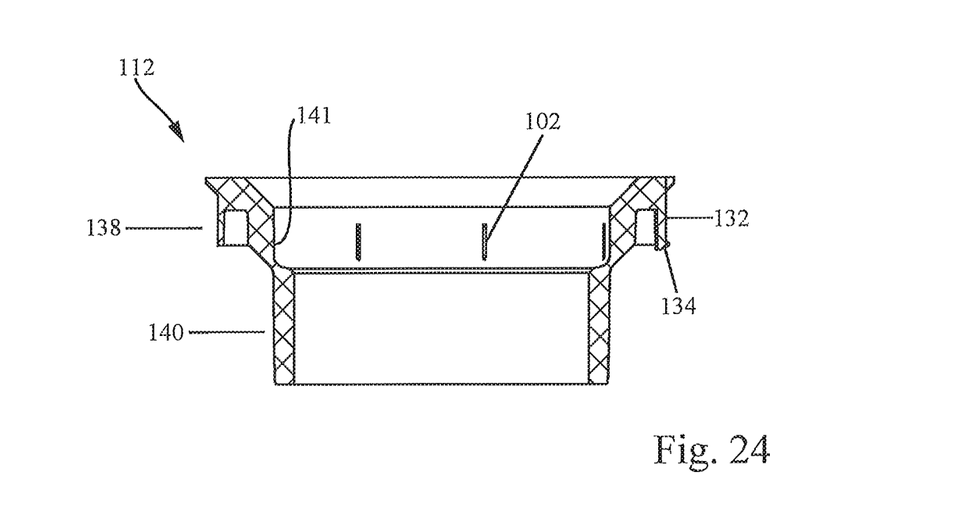
FIG. 24 is a cross-sectional view of a centering ring of a track widening system in accordance with some embodiments of the present invention.
Figure 25:
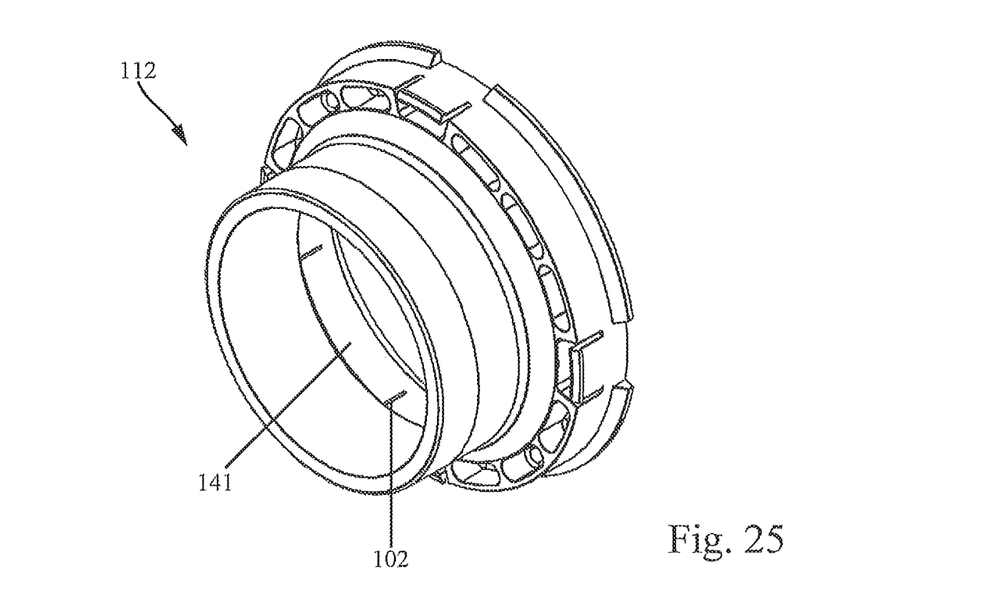
FIG. 25 is an oblique reverse view of the centering ring of FIG. 24.
Figure 26:
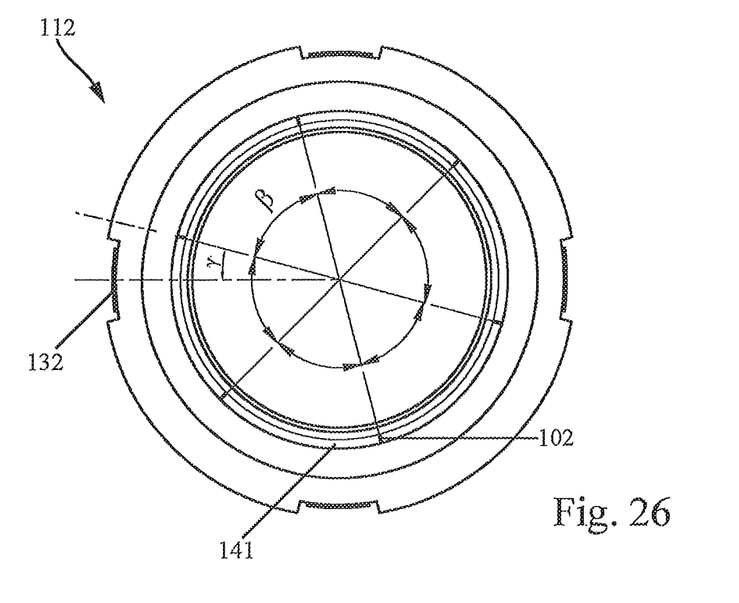
FIG. 26 is a forward view of the centering ring of FIG. 24.

In some embodiments of the present invention, one or more protrusions may extend inwardly from a hub centering portion of a centering ring. As illustrated in FIGS. 24 through 26, a centering ring 112 may include a hub centering portion 141, one or more protrusions 102, a rim centering portion 140, a retention portion 138, and one or more resilient arms 132, at the free end of which a catch projection 134 is arranged. In certain implementations, an outer surface of the rim centering portion 140 may be slightly conical. For example, and without limitation, an outer diameter of rim centering portion 140 may vary by a few tenths of a millimeter from an upper end to a lower end thereof. By a similar degree, hub centering portion 141 may also be slightly conical. As stated previously, making a hub centering portion conical may allow for the compensation of tolerances of the outer diameter of a wheel hub by keeping a centering ring free from play when it is placed onto a wheel hub.

Figure 24A:
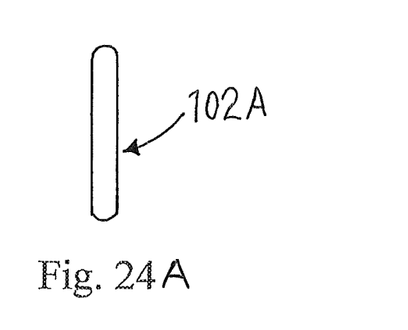
FIG. 24A is an enlarged plan view of a protrusion of a centering ring of a track widening system in the form of a rib.
Figure 24B:
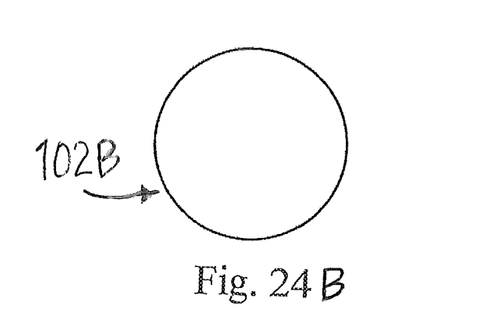
FIG. 24B is an enlarged plan view of a protrusion of a centering ring of a track widening system in the form of a bump.

In certain implementations, one or more protrusions 102 may be in the form of ribs 102A which may be integrally formed with hub centering portion 141 and may be vertically elongated, narrow in width, and rounded, as shown in FIG. 24A. In other embodiments, one or more protrusions 102 may be in the form of one or more bumps 102B (i.e., raised and rounded circular protrusions) as shown in FIG. 24B. For example, the length of a protrusion 102 may be about one millimeter and the width may be from about 0.3 millimeters to 0.4 millimeters. Ideally, a protrusion 102 may be oriented and sized such that it vertically extends along only portion of the hub centering portion 141 (i.e., the vertical length of protrusion 102 is less than the overall depth of hub centering portion 141). In preferred embodiments, the height of a protrusion 102 (i.e., the distance which protrusion 102 extends radially inward) may be no more than 2% of the radius of hub centering portion 141. For example, and without limitation, the height of a protrusion 102 may be from about 0.15 millimeters to 0.2 millimeters. It is to be appreciated, however, that other shapes and dimensions of protrusions are contemplated in accordance with some embodiments of the invention.

In the exemplary illustration of FIG. 26, centering ring 112 is shown with one or more resilient arms 132 and six equally spaced protrusions 102 extending inward from hub centering portion 141. As illustrated, the measured angle β between two adjacent protrusions 102, whose vertex is near a center of the centering ring 112, is approximately 60°. When a centering ring is constructed with a symmetrical, or nearly symmetrical, configuration, the stress applied to the hub centering portion may be equally distributed across the protrusions when the centering ring is secured onto a wheel hub. However, in some other embodiments, a centering ring may have protrusions which are arranged in an unequally spaced manner such that the measured angles for each pair of adjacent protrusions may be different. Furthermore, in some aspects of the present invention, a plurality of protrusions may be arranged in groups of two or more. For example and without limitation, five groups of protrusions may be arranged in an equally spaced configuration, where each group of protrusions consists of three closely spaced protrusions. It is to be appreciated, however, that other quantities and configurations of protrusions, and permutations thereof, are contemplated in accordance with the present invention.

When a centering ring is engaged with a track widening disc and then, collectively, centered on a wheel hub, the forces imparted on the resilient arms and the protrusions may be directly opposing, causing localized stress on the centering ring in the vicinity of each resilient arm. To reduce this localized stress, in some embodiments, one or more protrusions may be positioned to be offset from an adjacent resilient arm. For example, as further illustrated in FIG. 26, one or more protrusions 102 may be radially offset from a resilient arm 132 by an angle γ (i.e., the angle formed between a centerline of a resilient arm and an adjacent protrusion, where the vertex is near a center of a centering ring).

The foregoing descriptions of specific embodiments of the present invention have been presented for purposes of illustration and description. They are not intended to be exhaustive or to limit the invention to the precise forms disclosed, and many modifications and variations are possible in light of the above teachings. The embodiments were chosen and described in order to best explain the principles of the invention and its practical application, to thereby enable others skilled in the art to best utilize the invention and various embodiments with various modifications as are suited to the particular use contemplated. It is to be understood that variations and modifications of the present invention may be made without departing from the scope thereof. It is to be appreciated that the features disclosed herein may be used different combinations and permutations with each other, all falling within the scope of the present invention. It is also to be understood that the present invention is not to be limited by the specific embodiments disclosed herein, but only in accordance with the appended claims when read in light of the foregoing specification.

The invention claimed is:

1. A track widening system for motor vehicles, said track widening system comprising:
   a track widening disc having a central opening; and
   a centering ring for insertion into an opening of a wheel and for insertion into said central opening of said track widening disc, said centering ring defining an axis and comprising a collar at a rear side thereof, a retention portion adjacent to said collar, and a rim centering portion at a front side of said centering ring, a portion of said rim centering portion projecting beyond a front side of said track widening disc, said retention portion having an inner surface comprising a hub centering portion including at least one protrusion, said protrusion extending radially inwardly from said inner surface and having a circumferential dimension substantially less than a total circumference of said inner surface.

2. The track widening system of claim 1, further including a plurality of said protrusions extending radially inwardly from said inner surface of said retention portion and each having a circumferential dimension substantially less than the total circumference of said inner surface, said plurality of protrusions being circumferentially spaced from one another along said inner surface.

3. The track widening system of claim 1, wherein said track widening disc defines therein a plurality of wheel bolt holes disposed about said central opening and configured for receiving therein respective wheel bolts, said hub centering portion being disposed radially inwardly of said wheel bolt holes and being configured for receiving therein a wheel hub.

4. The track widening system of claim 1, wherein said protrusion extends radially inwardly from said inner surface of said retention portion beyond portions of said inner surface disposed circumferentially adjacent respective opposite sides of said protrusion.

5. The track widening system of claim 1, wherein said centering ring includes a resilient arm and a first catch device positioned at an end of said resilient arm, said track widening disc including a second catch device configured to cooperate with said first catch device.

6. The track widening system of claim 5, wherein said first catch device comprises a catch projection which projects radially outwardly and said second catch device extends around said central opening of said track widening disc.

7. The track widening system of claim 1, wherein said hub centering portion of said centering ring is conical.

8. The track widening system of claim 1, wherein said rim centering portion of said centering ring has an outer conical surface.

9. The track widening system of claim 8, wherein said hub centering portion of said centering ring is conical.

10. The track widening system of claim 3, wherein at least one of said plurality of said wheel bolt holes comprises a curved slot extending in a circumferential direction along said track widening disc.

11. The track widening system of claim 1, further including a plurality of centering rings each comprising a retention portion having an outer diameter and a rim centering portion having an outer diameter, said outer diameters of said retention portions being the same and said outer diameter of said rim centering portion of at least two of said plurality of centering rings being different.

12. The track widening system of claim 1, further including a plurality of track widening discs each having a thickness, said thickness of at least two of said plurality of track widening discs being different.

13. The track widening system of claim 1, further including a plurality of track widening discs each comprising a plurality of wheel bolt holes for receiving wheel bolts, an arrangement of said plurality of wheel bolt holes of at least two of said plurality of track widening discs being different.

14. The track widening system of claim 2, wherein said plurality of protrusions are equally spaced from one another along said inner surface.

15. The track widening system of claim 1, wherein said protrusion comprises one of a rib or a bump.

16. The track widening system of claim 1, wherein a height of said protrusion is not more than 2% of a radius of said hub centering portion of said centering ring.

17. The track widening system of claim 3, wherein said retention portion has an outer surface facing away from said inner surface thereof, said outer surface having an outer diameter substantially the same as an inner diameter of said central opening of said track widening disc to maintain said centering ring within, and to center said centering ring relative to, said central opening, said retention portion being disposed axially adjacent said collar, said track widening disc including a chamfered portion extending circumferentially along a rear side thereof axially adjacent said central opening, said collar comprising a chamfer configured to engage with said chamfered portion of said track widening disc and forming an axial stop during introduction of said centering ring into said central opening of said track widening disc.

18. A track widening system for motor vehicles, said track widening system comprising:
at least two track widening discs each comprising a central opening and having a thickness, said thickness of said at least two track widening discs being different; and
a plurality of centering rings for insertion into said central opening of said at least two track widening discs, each of said plurality of centering rings defining an axis and comprising a collar at a rear side, a retention portion adjacent said collar, and a rim centering portion at a front side for insertion into an opening of a wheel, a portion of each said rim centering portion projecting beyond a front side of said at least two track widening discs, each said retention portion having an inner surface comprising a hub centering portion including a plurality of protrusions extending radially inwardly therefrom, each said protrusion having a circumferential dimension substantially less than an entire circumference of said inner surface, an outer diameter of said retention portion of each of said plurality of centering rings being the same and an outer diameter of said rim centering portion of at least two of said plurality of centering rings being different.

19. The track widening system of claim 18, wherein said hub centering portion of at least one of said plurality of centering rings is conical.

20. The track widening system of claim 18, wherein said rim centering portion of at least one of said plurality of centering rings has an outer conical surface.

21. The track widening system of claim 20, wherein said hub centering portion of at least one of said plurality of centering rings is conical.

22. The track widening system of claim 18, wherein each of said protrusions comprises one of a rib or a bump.

23. The track widening system of claim 18, wherein a height of each said protrusion is not more than 2% of a radius of said hub centering portion of said centering ring.

24. A track widening system for motor vehicles, said track widening system comprising:
a track widening disc having a central opening;
a centering ring for insertion into an opening of a wheel and for insertion into said central opening of said track widening disc, said centering ring comprising:
a collar at a rear side of said centering ring;
a retention portion adjacent to said collar, an inner surface of said retention portion comprising a hub centering portion with at least one protrusion extending inwardly therefrom;
a rim centering portion at a front side of said centering ring, a portion of said rim centering portion projecting beyond a front side of said track widening disc; and
a frustoconical chamfered portion adjacent to said retention portion.

25. A track widening system for motor vehicles, said track widening system comprising:
a track widening disc having a central opening;
a centering ring for insertion into an opening of a wheel and for insertion into said central opening of said track widening disc, said centering ring comprising:
a collar at a rear side of said centering ring;
a retention portion adjacent to said collar, an inner surface of said retention portion comprising a hub centering portion with at least one protrusion extending inwardly therefrom;
a rim centering portion at a front side of said centering ring, a portion of said rim centering portion projecting beyond a front side of said track widening disc; and
a first catch device positioned at an end of a resilient arm, said protrusion of said hub centering portion being offset from said first catch device;
said track widening disc having a second catch device corresponding to said first catch device.

26. A track widening system for a motor vehicle, said track widening system comprising:
a track widening disc having a central opening and a plurality of holes disposed about said central opening and configured for receiving therein respective wheel bolts of a vehicle wheel hub; and
a centering ring defining a central axis and being disposed within said central opening of said track widening disc, said centering ring comprising a circumferentially extending retention region at a first side thereof configured to maintain said centering ring within, and to center said centering ring relative to, said central opening of said track widening disc, and a rim centering portion at a second side of said centering ring spaced axially from said first side, a portion of said rim centering portion projecting beyond a side of said track widening disc disposed adjacent said second side of said centering ring, said centering ring further comprising an inner annular surface disposed adjacent said first side thereof, said inner annular surface comprising a hub centering portion including at least one protrusion extending radially inwardly beyond portions of said inner annular surface disposed immediately circumferentially adjacent said protrusion.

* * * * *